United States Patent [19]

Ohms

[11] E Re. 30,128

[45] Reissued Oct. 30, 1979

[54] CONVEYOR CONTROL SYSTEM FOR A SELF-LOADING SCRAPER

[75] Inventor: Edward J. Ohms, East Peoria, Ill.

[73] Assignee: Caterpillar Tractor Co., Peoria, Ill.

[21] Appl. No.: 872,701

[22] Filed: Jan. 26, 1978

Related U.S. Patent Documents

Reissue of:

[64] Patent No.: 3,977,101
Issued: Aug. 31, 1976
Appl. No.: 627,826
Filed: Oct. 31, 1975

[51] Int. Cl.[2] ..... B60P 1/42

[52] U.S. Cl. ..... 37/4; 137/625.6; 280/489; 267/65 D

[58] Field of Search ..... 37/4, 8, 124 R, 126 R, 37/129; 137/625.6, 596.14; 280/481, 489; 267/65 D, 64 R; 198/657, 674, 675

[56] References Cited

U.S. PATENT DOCUMENTS

| | | | |
|---|---|---|---|
| 3,311,389 | 3/1967 | Barton et al. | 280/489 |
| 3,321,216 | 5/1967 | Carter | 280/489 |
| 3,469,861 | 9/1969 | Schexnayder | 280/479 |
| 3,568,718 | 3/1971 | Wilke et al. | 137/625.6 |
| 3,618,984 | 11/1971 | Cook et al. | 280/481 |
| 3,766,944 | 10/1973 | Distler | 137/625.6 |
| 3,859,741 | 1/1975 | Reinhardt | 37/8 |
| 3,863,367 | 2/1975 | Gee et al. | 37/8 |
| 3,865,135 | 2/1975 | McWilliams et al. | 267/64 R X |

*Primary Examiner*—E. H. Eickholt
*Attorney, Agent, or Firm*—Wegner, Stellman, McCord, Wiles & Wood

[57] ABSTRACT

A control system for the hydraulically powered *conveyor, such as an* auger, of a self-loading [auger] scraper that has a hydraulic cushion hitch which is locked out when the scraper is loading. A multi-position manually controlled pilot selector valve which is used to lock out the cushion hitch also initiates operation of the auger. The control system includes a pilot operated, normally open auger control valve through which flow of a signal line for a normally open unloading relief valve goes to drain. Moving the pilot selector valve from a first to a second position pressurizes the pilot line to close the auger control valve and thus isolate the signal line from drain, closing the unloading relief valve to isolate a pump for the auger motor from drain and cause it to power the motor.

5 Claims, 3 Drawing Figures

CONVEYOR CONTROL SYSTEM FOR A SELF-LOADING SCRAPER

Matter enclosed in heavy brackets [ ] appears in the original patent but forms no part of this reissue specification; matter printed in italics indicates the additions made by reissue.

BACKGROUND OF THE INVENTION

Self-loading [auger] scrapers *with a conveyor, such as an auger,* have complex hydraulic systems with a large number of controls at the operator's cab, and in order to minimize the complexity of the operation it is desirable to combine controls where it is practical to do so. The operator must, of course, be able to move the scraper bowl between an elevated road position and a lower loading and unloading position. There is also a control for the bowl apron which closes the front of the bowl when a load is being transported and which is moved for loading and unloading. The auger must operate during loading, and in the case of a fixed auger must also operate during unloading. There is also a pitch and bounce control which should be operative when the unit is in transport mode but which must be locked out for loading and unloading.

U.S. Patent 3,311,389 discloses a system for control of pitch and bounce in tractor-trailer combinations, referred to herein as a cushion hitch. U.S. Patent 3,618,984 discloses a pilot selector valve for simultaneously controlling separate fluid circuits of a device such as a self-loading scraper. The pilot selector valve of Patent 3,618,984 permits a single manual valve control handle to control the operation of two operating circuits which are essentially separate; and is disclosed in that patent as simultaneously controlling the locking out of a cushion hitch and the operation of a push-pull coupling control circuit for tandem machines as disclosed in U.S. Patent 3,469,861.

Patent 3,618,984 discloses a manually controlled three position pilot selector valve which has a first position in which the cushion hitch is operative for controlling pitch and bounce of the tractor and trailer during transport, either loaded or unloaded; a second position in which the cushion hitch is locked in a lowermost position to provide a rigid connection between the tractor and trailer for loading and unloading; and a third position in which the cushion hitch is still locked down, and in addition the push-pull coupling is actuated to tie two tractors together in tandem.

SUMMARY OF THE INVENTION

*The hydraulic control system of the present invention is shown and described as controlling the operation of a rotary hydraulic motor. In the specific embodiment shown the motor drives an auger conveyor that serves as a loading assist for the bowl of a self-loading scraper.*

In accordance with the present invention, a manually operated pilot selector valve as disclosed in patent 3,618,984 is used as disclosed in that patent to cause the cushion hitch to be operative in one position, to lock out the cushion hitch in two other positions, and to cause the auger of an auger scraper of the general type disclosed in U.S. Patent 3,863,367 to operate in the third position of the control.

Thus, the same manual control movement which locks out the cushion hitch for loading also causes operation of the auger.

The hydraulic system of the present invention has two double pumps, one of which delivers 60 gallons per minute for scraper operation and 21 gallons per minute for auger operation; and the other of which provides 8 gallons per minute for operation of the cushion hitch and 60 gallons per minute for auger operation. In addition to a selector valve as taught in patent 3,618,984, the control circuit includes a normally open, pilot operated auger control valve and an unloading relief valve which is normally open and which is closed by a hydraulic signal.

In a first position of the pilot selector valve the output of both auger pumps goes through the normally open unloading relief valve to the fluid reservoir. The signal line for the unloading relief valve is connected to drain through the normally open auger control valve; and the pilot line for the operation of the auger control valve is connected to drain through the pilot selector valve.

When the manual control of the pilot selector valve is moved from the first position to a second position, it blocks the pilot line at the selector valve and opens it to pressure from the cushion hitch pump, thus closing the auger control valve and isolating the signal line for the unloading relief valve from the drain connection. This causes the unloading relief valve to close, isolating the two auger pumps from the drain return to the reservoir and causing the output of both pumps to go to the auger drive motor.

THE DRAWINGS

DETAILED DESCRIPTION OF THE INVENTION

Figure 1:
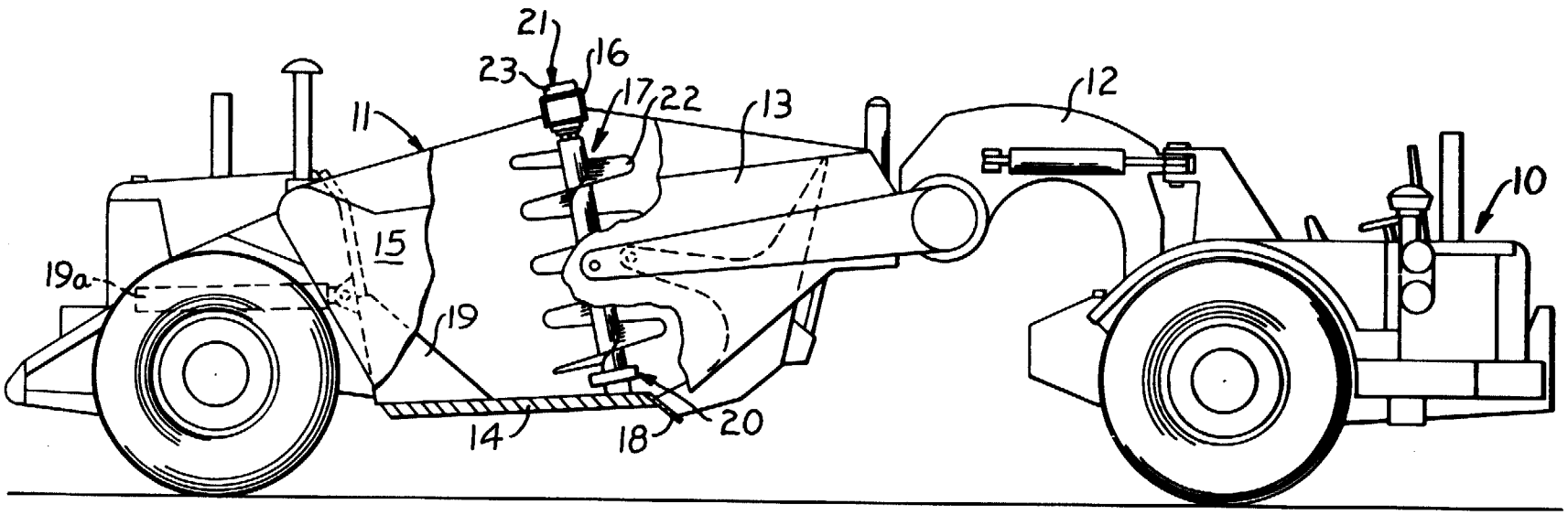
FIG. 1 is a side elevational view, partly in section, of a self-loading auger scraper.

Referring to FIG. 1, the apparatus of the present invention consists generally of a tractor 10 to which a scraper 11 is connected by means of a conventional gooseneck 12. The scraper 11 includes a bowl 13 having a floor 14 and sidewalls 15, and a cross beam 16 between the upper ends of the sidewalls cooperates with the bowl floor 14 in mounting an auger assembly, which is indicated generally at 17 and has its lower end close to a forward cutting edge 18 of the bowl. The scraper is illustrated as provided with ejector means, indicated generally at 19, of the type disclosed and claimed in patent 3,863,367.

The auger assembly 17 consists generally of a supporting bearing assembly, indicated generally at 20, which is secured to the bowl floor 14; auger drive means 21 which is mounted upon the top cross beam 16; and an auger, indicated generally at 22.

In addition to the scraper bowl and auger components illustrated in FIG. 1, the apparatus is to be understood as including a cushion hitch structure of the type disclosed in U.S. Patent 3,311,389.

Figures 2, 3:
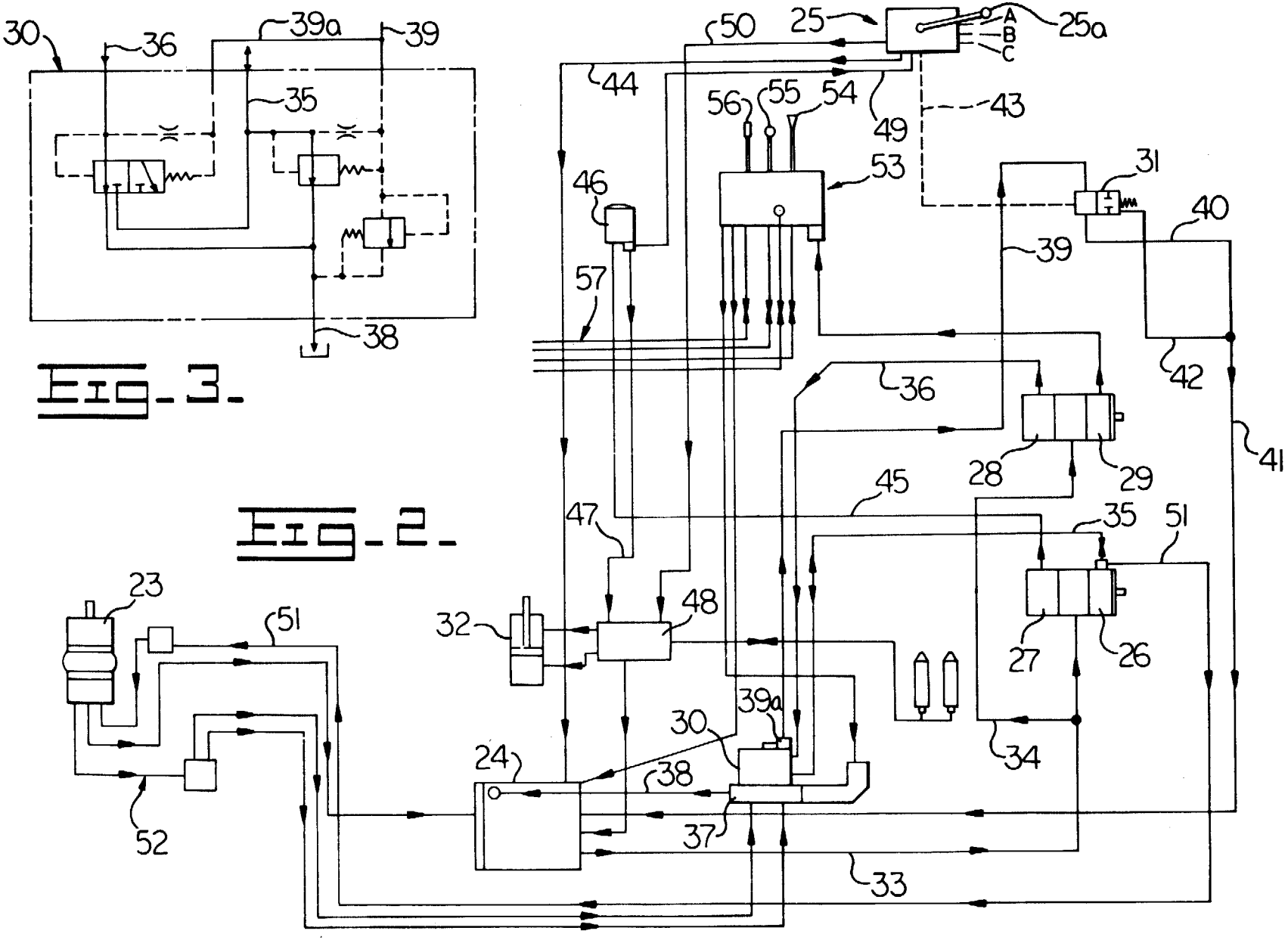
FIG. 2 is a hydraulic circuit diagram of that portion of the hydraulic circuit which relates to operation and control of the auger and cushion hitch.
FIG. 3 is a hydraulic schematic view of the unloading relief valve used in the control circuit.

Turning now to FIGS. 2 and 3, the hydraulic operating and control circuit for a hydraulic motor 23 of the auger drive means 21 includes a hydraulic fluid reservoir 24; a manual pilot selector valve 25 of the kind disclosed in patent 3,618,984; a large auger pump 26 having a capacity of 60 gallons per minute and which is coupled with a cushion hitch pump 27 that has a capacity of 8 gallons per minute; a small auger pump 28 that delivers 21 gallons per minute and is coupled with a 60 gallon per minute scraper pump 29 that is not part of the auger operating and control system; a relief and unloading valve 30; and a normally open, pilot operated auger control valve 31; together with the necessary pipes and conduits between the foregoing components, the hydraulic motor 23 and the reservoir 24.

As disclosed in patent 3,618,984, the manual pilot selector valve 25 is a spool valve which has an operating handle 25a that is movable between the A position shown in FIG. 2, a B position, and a C position. In the A position of the pilot selector valve 25 a cushion hitch means, indicated generally at 32, is in a transport mode as disclosed in patent 3,311,389, and the auger motor 23 is idle. In the B position, in accordance with the teachings of patent 3,618,984, the cushion hitch is deactivated with the cushion hitch locked in a bottomed out position as taught in patent 3,311,389, and the auger motor 23 is still idle. In the C position of valve 25 the cushion hitch is still locked down and the auger motor 23 is powered from the pumps 26 and 28 to drive the auger.

The B position of the valve 25 is rarely used, because ordinarily the cushion hitch is lowered and locked only for loading or unloading, and in those situations the auger motor 23 should be driving. However, there are occasional situations when the operator may want to lock down the cushion hitch when the apparatus is in its transport mode so as to afford the maximum possible control over a loaded vehicle being operated under difficult driving conditions.

A fluid conduit 33 and a branch conduit 34 connect the reservoir 24 with the low pressure sides of the pumps 26, 27, 28 and 29. The high pressure sides of the pumps 26 and 28 connect with the unloading relief valve 30 through respective lines 35 and 36; and as illustrated in FIG. 3, the valve 30 is normally open to the reservoir 24 through a manifold 37 and a drain conduit 38. Thus, the output of the auger pumps 26 and 28 is unloaded to the reservoir in the A position of the manual pilot selector valve 25.

Control of the unloading relief valve 30 is by means of a signal conduit 39 which is joined exteriorly of the valve 30 by a signal conduit 39a so that, in effect, the two signal conduits acts as one in the control of the valve 30. The signal line 39 is connected through the normally open auger control valve 31 to a return line 40 which drains directly to the reservoir 24 through a drain line 41 which also may receive fluid from a conventional leakage drain line 42 connected to the valve 31.

A pilot line 43 for the valve 31 is connected to the manual pilot selector valve 25, and in the A position of the pilot selector valve the pilot line 43 is in communication with a drain line 44 through which fluid from the valve 25 returns to the reservoir 24.

Also, in the A position of the pilot selector valve 25 the output of the pump 27 is delivered through a line 45 to a filter 46 from which the principal flow goes through a line 47 to a normally closed control valve 48 for the cushion hitch cylinder 32. The balance of the flow from the filter 46 goes through a line 49 to the pilot selector valve 25, and from there through a pilot line 50 the pressure from which keeps the normally closed valve 48 open as long as the pilot selector valve 25 is in the A position.

When the pilot selector valve is moved to the B position, the fluid from the line 49 is isolated from the pilot line 50 and returns through the drain line 44 to the reservoir 24. In this position of the pilot selector valve the condition of the auger control valve 31 remains unchanged.

When the pilot selector valve 25 is moved to the C position, it terminates communication between the pilot line 43 and the drain line 44 and places the line 49 from the cushion hitch pump 27 into communication with the pilot line 43 so as to close the valve 31. This blocks communication between the signal lines 39-39a and the return line 40 and drain line 41 and causes the unloading relief valve 30 to break communication between the lines 35 and 36 and the drain line 38. The output from the auger pump 28 through the line 36 to the valve 30 is shifted within the valve to the line 35, as indicated by the reverse arrows in that line; so the output from the pump 28 combines with that of the pump 26 and goes through a drive conduit 51 to the auger motor 23 from which the fluid returns to the reservoir 24 through several lines which are numbered collectively 52.

For the sake of completeness, the output from the scraper pump 29 goes to a multiple function scraper control valve, indicated generally at 53, which is provided with a scraper control handle 54, an apron control handle 55, and an ejector control handle 56. A group of conduits, indicated generally at 57, carry fluid from the control valve 53 selectively to an ejector cylinder 19a (FIG. 1) or to a bowl cylinder or to an apron cylinder, depending upon the positions of the manual controls 54, 55 and 56.

The foregoing detailed description is given for clearness of understanding only and no unnecessary limitations should be understood therefrom, as modifications will be obvious to those skilled in the art.

What is claimed is:

1. In a self-loading auger scraper that includes a tractor, a scraper articulately connected to the tractor through a hydraulic cushion hitch assembly, a scraper bowl, an auger mounted in the bowl, a hydraulic motor for driving the auger, a fluid reservoir, first pump means for supplying fluid under pressure from said reservoir to the cushion hitch assembly, and second pump means for supplying fluid under pressure from the reservoir to the auger motor, control means for directing the output of said second pump means selectively to the auger motor or to the reservoir, said control means comprising, in combination:

a manually controlled pilot selector valve which has at least first and second positions;

an unloading relief valve;

a pilot operated normally open auger control valve;

a pressure conduit connecting the output of the first pump means to the pilot selector valve;

a pilot line from said pilot selector valve to the auger control valve;

a drain line from the pilot selector valve to the reservoir;

a signal line from the unloading relief valve to the auger control valve;

a return line from the auger control valve to the reservoir;

unloading conduit means from the second pump means to the unloading relief valve;

drain conduit means from the unloading relief valve to the reservoir;

and drive conduit means from said second pump means to the auger motor, a first position of said pilot selector valve connecting said pilot line to said drain line, said auger control valve in said first position being open between said signal line and said return line to maintain the unloading relief valve open between the unloading conduit means and the drain conduit means, and manual movement of said pilot selector valve to a second position serving to close the drain line and subject the pilot line to pressure from the pressure conduit so as to close the auger control valve between the signal line and the return line, closing of said signal line serving to close the unloading relief valve between the unloading conduit means and the drain conduit means, whereby fluid from the second pump means goes through the drive conduit means to the auger motor.

2. In a self-loading auger scraper that includes a tractor, a scraper articulately connected to the tractor through a hydraulic cushion hitch assembly, a scraper bowl, an auger mounted in the bowl, a hydraulic motor for driving the auger, a fluid reservoir, first pump means for supplying fluid under pressure from said reservoir to the cushion hitch assembly, and second pump means for supplying fluid under pressure from the reservoir to the auger motor, control means for directing the output of said second pump means selectively to the auger motor or to the reservoir, said control means comprising, in combination:

a manually controlled pilot selector valve which has at least first and second positions;

a pilot operated, normally open auger control valve the pilot line of which is open to drain in a first position of said pilot selector valve;

an unloading relief valve having a signal line which connects to drain through said auger control valve, said unloading relief valve being normally open to connect said second pump means to drain;

and drive conduit means from said second pump means to the auger motor, movement of said pilot selector valve to a second position isolating the pilot line from drain and connecting it to the first pump to close the auger control valve, thereby isolating said signal line from drain and closing said unloading relief valve, whereby in said second position of the pilot selector valve fluid from said second pump means goes through the drive conduit to the auger motor.

3. The combination of claim 2 in which the second pump means comprises two pumps, both of which are connected through the unloading relief valve to the reservoir in the first position of the pilot selector valve, and in which the output of the second of said two pumps passes through the unloading relief valve and joins the output from the first of said two pumps.

*4. In a self-loading scraper that includes a tractor, a scraper articulately connected to the tractor through a hydraulic cushion hitch assembly, a scraper bowl, a loading assist mounted in the bowl, a hydraulic motor for driving the loading assist, a fluid reservoir, a first pump means for supplying fluid under pressure from said reservoir to the cushion hitch assembly, and second pump means for supplying fluid under pressure from the reservoir to the hydraulic motor, control means for directing the output of said second pump means selectively to the hydraulic motor or to the reservoir, said control means comprising, in combination:*

*a manually controlled pilot selector valve which has at least first and second positions;*

*an unloading relief valve;*

*a pilot operated normally open hydraulic motor control valve;*

*a pressure conduit connecting the output of the first pump means to the pilot selector valve;*

*a pilot line from said pilot selector valve to the hydraulic motor control valve;*

*a drain line from the pilot selector valve to the reservoir;*

*a signal line from the unloading relief valve to the hydraulic motor control valve;*

*a return line from the hydraulic motor control valve to the reservoir;*

*unloading conduit means from the second pump means to the unloading relief valve;*

*drain conduit means from the unloading relief valve to the reservoir;*

*and drive conduit means from said second pump means to the hydraulic motor,*

*a first position of said pilot selector valve connecting said pilot line to said drain line,*

*said hydraulic motor control valve in said first position being open between said signal line and said return line to maintain the unloading relief valve open between the unloading conduit means and the drain conduit means,*

*and manual movement of said pilot selector valve to a second position serving to close the drain line and subject the pilot line to pressure from the pressure conduit so as to close the hydraulic motor control valve between the signal line and the return line,*

*closing of said signal line serving to close the unloading relief valve between the unloading conduit means and the drain conduit means,*

*whereby fluid from the second pump means goes through the drive conduit means to the hydraulic motor.*

*5. In a self-loading scraper that includes a tractor, a scraper articulately connected to the tractor through a hydraulic cushion hitch assembly, a scraper bowl, a loading assist mounted in the bowl, a hydraulic motor for driving the loading assist, a fluid reservoir, first pump means for supplying fluid under pressure from said reservoir to the cushion hitch assembly, and second pump means for supplying fluid under pressure from the reservoir to the hydraulic motor, control means for directing the output of said second pump means selectively to the hydraulic motor or to the reservoir, said control means comprising, in combination:*

*a manually controlled pilot selector valve which has at least first and second positions;*

*a pilot operated, normally open hydraulic motor control valve the pilot line of which is open to drain in a first position of said pilot selector valve;*

*an unloading relief valve having a signal line which connects to drain through said hydraulic motor control valve, said unloading relief valve being normally open to connect said second pump means to drain;*

*and drive conduit means from said second pump means to the hydraulic motor,*

*movement of said pilot selector valve to a second position isolating the pilot line from drain and connecting it to the first pump to close the hydraulic motor control valve, thereby isolating said signal line from drain and closing said unloading relief valve, whereby in said second position of the pilot selector valve fluid from said second pump means goes through the drive conduit to the hydraulic motor.*

* * * * *